US008081108B2

(12) United States Patent
Remondi et al.

(10) Patent No.: US 8,081,108 B2
(45) Date of Patent: Dec. 20, 2011

(54) AUTONOMOUS PROJECTION OF GLOBAL NAVIGATION SATELLITE ORBITS

(75) Inventors: Benjamin William Remondi, Dickerson, MD (US); Peter Van Wyck Loomis, Sunnyvale, CA (US); Herbert Landau, Hoehenkirchen (DE)

(73) Assignee: Trimble Navigation Limited, Sunnyvale, CA (US)

( * ) Notice: Subject to any disclaimer, the term of this patent is extended or adjusted under 35 U.S.C. 154(b) by 746 days.

(21) Appl. No.: 12/008,027

(22) Filed: Jan. 7, 2008

(65) Prior Publication Data

US 2010/0283681 A1  Nov. 11, 2010

(51) Int. Cl.
*G01S 19/27* (2010.01)
(52) U.S. Cl. .................................. 342/357.66
(58) Field of Classification Search ... 342/357.2–357.78
See application file for complete search history.

(56) References Cited

U.S. PATENT DOCUMENTS

| | | |
|---|---|---|
| 3,796,322 A | 3/1974 | Cording |
| 4,752,012 A | 6/1988 | Juergens |
| 4,857,753 A | 8/1989 | Mewburn-Crook et al. |
| 5,095,531 A | 3/1992 | Ito |
| 5,224,388 A | 7/1993 | Pratt |
| 5,359,542 A | 10/1994 | Pahmeier et al. |
| 5,491,486 A | 2/1996 | Welles, II |
| 5,634,565 A | 6/1997 | Kesage |
| 5,640,452 A | 6/1997 | Murphy |
| 5,650,770 A | 7/1997 | Schlager et al. |
| 5,752,197 A | 5/1998 | Rautiola |
| 5,859,839 A | 1/1999 | Ahlenius et al. |
| 5,883,817 A | 3/1999 | Chisholm et al. |
| 5,890,091 A | 3/1999 | Talbot et al. |
| 5,917,405 A | 6/1999 | Joao |
| 5,987,379 A | 11/1999 | Smith |
| 6,016,117 A | 1/2000 | Nelson, Jr. |
| 6,046,687 A | 4/2000 | Janky |
| 6,064,335 A | 5/2000 | Eschenbach |
| 6,067,031 A | 5/2000 | Janky et al. |
| 6,118,196 A | 9/2000 | Cheng-Yon |
| 6,124,825 A | 9/2000 | Eschenbach |
| 6,144,307 A | 11/2000 | Elliot |
| 6,166,688 A | 12/2000 | Cromer et al. |
| 6,243,648 B1 | 6/2001 | Kilfeather et al. |

(Continued)

FOREIGN PATENT DOCUMENTS

GB  2373086  9/2002

(Continued)

OTHER PUBLICATIONS

"Tower Cranes Anti-Collision and Zone Protection System", www.tac3000.com,(2004), 36.

(Continued)

*Primary Examiner* — Thomas Tarcza
*Assistant Examiner* — Nga X Nguyen

(57) ABSTRACT

In a method of autonomous orbit projection performed within a Global Navigation Satellite System (GNSS) receiver, distinct broadcast orbits are received over time from a GNSS satellite during operation of the GNSS receiver. A plurality of the distinct broadcast orbits are stored within the GNSS receiver. Within the GNSS receiver, a plurality of the stored broadcast orbits are converted into a time series of range data for the GNSS satellite. A projected orbit for the GNSS satellite is determined by utilizing the time series of range data as an input to an orbit projector of the GNSS receiver.

21 Claims, 7 Drawing Sheets

U.S. PATENT DOCUMENTS

| | | |
|---|---|---|
| 6,268,804 B1 | 7/2001 | Janky et al. |
| 6,297,744 B1 | 10/2001 | Baillargeon et al. |
| 6,301,616 B1 | 10/2001 | Pal et al. |
| 6,317,500 B1 | 11/2001 | Murphy |
| 6,320,273 B1 | 11/2001 | Nemec |
| 6,330,149 B1 | 12/2001 | Burrell |
| 6,356,196 B1 | 3/2002 | Wong et al. |
| 6,362,736 B1 | 3/2002 | Gehlot |
| 6,377,165 B1 | 4/2002 | Yoshioka et al. |
| 6,439,515 B1 | 8/2002 | Powers |
| 6,453,237 B1 | 9/2002 | Fuchs et al. |
| 6,459,988 B1 | 10/2002 | Fan et al. |
| 6,480,788 B2 | 11/2002 | Kilfeather et al. |
| 6,501,421 B1 | 12/2002 | Dutta |
| 6,505,049 B1 | 1/2003 | Dorenbosch |
| 6,512,465 B2 | 1/2003 | Flick |
| 6,539,307 B1 | 3/2003 | Holden et al. |
| 6,560,536 B1 | 5/2003 | Sullivan et al. |
| 6,609,064 B1 | 8/2003 | Dean |
| 6,650,242 B2 | 11/2003 | Clerk et al. |
| 6,651,000 B2 | 11/2003 | Diggelen et al. |
| 6,657,587 B1 | 12/2003 | Mohan |
| 6,658,336 B2 | 12/2003 | Browne et al. |
| 6,658,349 B2 | 12/2003 | Cline |
| 6,675,095 B1 | 1/2004 | Bird et al. |
| 6,677,938 B1 | 1/2004 | Maynard |
| 6,700,762 B2 | 3/2004 | Underwood et al. |
| 6,725,158 B1 | 4/2004 | Sullivan et al. |
| 6,801,853 B2 | 10/2004 | Workman |
| 6,804,602 B2 | 10/2004 | Impson et al. |
| 6,826,452 B1 | 11/2004 | Holland et al. |
| 6,829,535 B2 | 12/2004 | Diggelen et al. |
| 6,843,383 B2 | 1/2005 | Schneider et al. |
| 6,864,789 B2 | 3/2005 | Wolfe |
| 6,865,169 B1 | 3/2005 | Quayle et al. |
| 6,934,629 B1 | 8/2005 | Chisholm et al. |
| 6,970,801 B2 | 11/2005 | Mann |
| 6,981,423 B1 | 1/2006 | Discenzo |
| 7,020,555 B1 | 3/2006 | Janky et al. |
| 7,031,883 B1 | 4/2006 | Lee |
| 7,032,763 B1 | 4/2006 | Zakula, Sr. et al. |
| 7,034,683 B2 | 4/2006 | Ghazarian |
| 7,050,907 B1 | 5/2006 | Janky et al. |
| 7,070,060 B1 | 7/2006 | Feider et al. |
| 7,095,368 B1 | 8/2006 | Diggelen |
| 7,095,370 B1 | 8/2006 | Diggelen et al. |
| 7,158,883 B2 | 1/2007 | Fuchs et al. |
| 7,212,120 B2 | 5/2007 | Gudat |
| 7,289,875 B2 | 10/2007 | Recktenwald et al. |
| 7,295,855 B1 | 11/2007 | Larsson et al. |
| 7,298,319 B2 | 11/2007 | Han et al. |
| 7,308,114 B2 | 12/2007 | Takehara et al. |
| 7,313,476 B2 | 12/2007 | Nichols et al. |
| 7,324,921 B2 | 1/2008 | Sugahara et al. |
| 7,344,037 B1 | 3/2008 | Zakula et al. |
| 7,367,464 B1 | 5/2008 | Agostini et al. |
| 7,398,153 B2 | 7/2008 | Workman et al. |
| 7,548,200 B2 | 6/2009 | Garin et al. |
| 7,548,816 B2 | 6/2009 | Riben et al. |
| 7,639,181 B2 | 12/2009 | Wang et al. |
| 7,667,642 B1 | 2/2010 | Frericks et al. |
| 7,710,317 B2 * | 5/2010 | Cheng et al. ............. 342/357.64 |
| 7,719,416 B2 | 5/2010 | Arms et al. |
| 2002/0070856 A1 | 6/2002 | Wolfe |
| 2002/0082036 A1 | 6/2002 | Ida et al. |
| 2002/0117609 A1 | 8/2002 | Thibault et al. |
| 2002/0142788 A1 | 10/2002 | Chawla et al. |
| 2002/0196151 A1 | 12/2002 | Troxler |
| 2003/0045314 A1 | 3/2003 | Burgan et al. |
| 2003/0064744 A1 | 4/2003 | Zhang et al. |
| 2003/0073435 A1 | 4/2003 | Thompson et al. |
| 2003/0119445 A1 | 6/2003 | Bromham et al. |
| 2004/0024522 A1 | 2/2004 | Walker et al. |
| 2004/0034470 A1 | 2/2004 | Workman |
| 2004/0044911 A1 | 3/2004 | Takada et al. |
| 2004/0196182 A1 | 10/2004 | Unnold |
| 2004/0219927 A1 | 11/2004 | Sumner |
| 2004/0243285 A1 | 12/2004 | Gounder |
| 2005/0030175 A1 | 2/2005 | Wolfe |
| 2005/0055161 A1 | 3/2005 | Kalis et al. |
| 2005/0095985 A1 | 5/2005 | Hafeoz |
| 2005/0103738 A1 | 5/2005 | Recktenwald et al. |
| 2005/0116105 A1 | 6/2005 | Munk et al. |
| 2005/0137742 A1 | 6/2005 | Goodman et al. |
| 2005/0147062 A1 | 7/2005 | Khouaja et al. |
| 2005/0154904 A1 | 7/2005 | Bhargav |
| 2005/0179541 A1 | 8/2005 | Wolfe |
| 2005/0242052 A1 | 11/2005 | O'Connor et al. |
| 2006/0027771 A1 | 2/2006 | Abts |
| 2006/0181452 A1 * | 8/2006 | King et al. ............. 342/357.02 |
| 2006/0243056 A1 | 11/2006 | Sundermeyer et al. |
| 2007/0005244 A1 | 1/2007 | Nadkarni |
| 2007/0255498 A1 | 11/2007 | McDaniel et al. |
| 2008/0014965 A1 | 1/2008 | Dennison et al. |
| 2008/0036617 A1 | 2/2008 | Arms et al. |
| 2008/0100977 A1 | 5/2008 | Shreiner et al. |
| 2008/0122234 A1 | 5/2008 | Alioto et al. |
| 2009/0009389 A1 * | 1/2009 | Mattos ............. 342/357.15 |
| 2009/0109049 A1 | 4/2009 | Frederick et al. |
| 2010/0100338 A1 | 4/2010 | Vik et al. |

FOREIGN PATENT DOCUMENTS

| | | |
|---|---|---|
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |
| JP | 2002/217811 | 8/2002 |
| WO | WO-00/68907 | 11/2000 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Anti-Collision Systems A Clash of Cultures", http://www.cranestodaymagazine.com/story.asp?sectionCode=66&storyCode=2043070, (Mar. 21, 2007), 6.

Abderrahim, M. et al., "A Mechatronics Security System for the Construction Site", www.elsevier.com/locate/autcon, (Sep. 7, 2004),460-466.

"Highland Man's Invention Success With Dewalt", http://www.heraldextra.com/content/view/195674/4/, (Oct. 8, 2006), 3.

* cited by examiner

400

RECEIVING DISTINCT BROADCAST ORBITS FROM A GNSS SATELLITE, THE DISTINCT BROADCAST ORBITS RECEIVED IN A GNSS RECEIVER OVER TIME DURING OPERATION OF THE GNSS RECEIVER.
410

STORING A PLURALITY OF THE DISTINCT BROADCAST ORBITS WITHIN THE GNSS RECEIVER.
420

CONVERTING A PLURALITY OF THE STORED BROADCAST ORBITS INTO A TIME SERIES OF RANGE DATA FOR THE GNSS SATELLITE, THE CONVERTING PERFORMED WITHIN THE GNSS RECEIVER.
430

DETERMINING A PROJECTED ORBIT FOR THE GNSS SATELLITE BY UTILIZING THE TIME SERIES OF RANGE DATA AS AN INPUT TO AN ORBITAL PROJECTION PROGRAM OF THE GNSS RECEIVER.
440

STORING THE PROJECTED ORBIT WITHIN THE GNSS RECEIVER.
450

RECEIVING DISTINCT BROADCAST ORBITS FROM A GNSS SATELLITE, THE DISTINCT BROADCAST ORBITS RECEIVED IN A GNSS RECEIVER OVER TIME DURING OPERATION OF THE GNSS RECEIVER.
410

↓

STORING A PLURALITY OF THE DISTINCT BROADCAST ORBITS WITHIN THE GNSS RECEIVER.
420

↓

CONVERTING A PLURALITY OF THE STORED BROADCAST ORBITS INTO A TIME SERIES OF RANGE DATA FOR THE GNSS SATELLITE, THE CONVERTING PERFORMED WITHIN THE GNSS RECEIVER.
430

↓

DETERMINING A PROJECTED ORBIT FOR THE GNSS SATELLITE BY UTILIZING THE TIME SERIES OF RANGE DATA AS AN INPUT TO AN ORBITAL PROJECTION PROGRAM OF THE GNSS RECEIVER.
440

↓

STORING THE PROJECTED ORBIT WITHIN THE GNSS RECEIVER.
450

↓

UPON A FUTURE INITIALIZATION OF THE GNSS RECEIVER, PERFORMING A FAST ACQUISITION OF SAID GNSS SATELLITE BASED UPON THE PROJECTED ORBIT FOR THE GNSS SATELLITE.
660

FIG. 6

AUTONOMOUS PROJECTION OF GLOBAL NAVIGATION SATELLITE ORBITS

BACKGROUND

As early as Sputnik, satellite orbits were determined by measuring the location and speed of the satellite relative to an observer on earth. For instance, by knowing the frequency of transmission of a signal emanating from a satellite, the Doppler shift in a received version of the signal can be measured. This Doppler shift information can then be used to determine the orbital trajectory of a satellite about the earth. Besides Doppler shift measurements there are many other orbit measurement data types. Another orbit measurement example is range data from one or more earth fixed stations to the satellite obtained by bouncing a signal off the satellite and measuring the two-way travel time. Yet another example of an orbit determination observation is the position and/or velocity of the satellite at an instant. All of these orbit determination examples, as well as others, will be referenced as range data.

Today, orbit information is broadcast from Global Navigation Satellites. For example, the Department of Defense broadcasts the orbits of the NAVSTAR Global Positioning System (GPS) satellites in two forms. A first form of broadcast is low precision orbit information that is broadcast as part of an Almanac of general information regarding the orbits of all GPS satellites. The almanac is broadcast from every satellite and contains low precision information regarding satellite locations and orbits that are valid for about 30 days into the future. A second form of broadcast is a high precision "broadcast orbit" which is transmitted as an individual orbit for a particular satellite. Each GPS satellite transmits a broadcast orbit, which contains refined data about its own orbit. It takes about 30 seconds to receive the refined orbit from a particular satellite. A particular distinct broadcast orbit is repeatedly transmitted over a span of two hours by a GPS satellite, and is valid for a period of approximately four hours from its initial transmission. After two hours of repeated transmission a new distinct broadcast orbit is transmitted. This process repeats every two hours.

In today's world, users would like to turn a GNSS receiver on and have it fully ready to go in a several seconds or less, rather than the 30 seconds to several minutes that it can often take to perform an "ordinary acquisition" after turning on a GPS receiver. One technique to improve acquisition speed is to utilize almanac data to fairly quickly locate and acquire the satellites. However, as almanac data does not provide precise orbital data regarding the satellites acquired, a receiver has to download the broadcast orbit from an acquired satellite in order to "learn" more precisely where the satellite is located and thus make more precise positional measurements. Such an acquisition method may be fine for a user who is, for instance, navigating an automobile. This is because the reduced accuracy (e.g. positional accuracy within several meters) that is quickly achieved using the almanac information may be adequate for a task such as navigating a car while the receiver is still trying to acquire the broadcast orbits. However this reduced level of accuracy is not suited for other tasks such as engineering work. For example positional accuracy of a couple meters would be inadequate for surveying work which requires accuracy a few centimeters or less.

A second technique for improving the speed of acquisition of satellites also reduces the amount of time required to provide highly accurate positional information to several second (e.g., 3-15 seconds). This second technique involves downloading precise orbital data regarding GNSS satellites from the Internet or some other source. The precise orbital data is used to determine the satellites in view and the frequencies on which to acquire the signal(s) broadcast from these satellites. This speeds acquisition by enabling a receiver to search for signals only from satellites that are in view. This also speeds acquisition by eliminating the requirement for a receiver to search across the large range of frequencies that the signal(s) may be received upon depending upon how Doppler shift impacts reception. Finally, this allows precise positional determinations to be made without waiting to receive the broadcast orbits from each individual navigation satellite being tracked by the GNSS receiver.

One issue with this second technique for improving the speed of acquisition is that it can be costly either to acquire the precise orbit data (for example if it must be purchased) or to support a data connection to acquire the precise orbit data. Another issue with this second technique for fast acquisition is that there are some instances where it is not possible to connect with a source for such data, either because a data connection is non-existent at a particular location or because a data connection or the data source is malfunctioning.

SUMMARY

In a method of autonomous orbit projection performed within a Global Navigation Satellite System (GNSS) receiver, distinct broadcast orbits are received over time from a GNSS satellite during operation of the GNSS receiver. A plurality of the distinct broadcast orbits are stored within the GNSS receiver. Within the GNSS receiver, a plurality of the stored broadcast orbits are converted into a time series of range data for the GNSS satellite. A projected orbit for the GNSS satellite is determined by utilizing the time series of range data as an input to an orbit projector of the GNSS receiver.

BRIEF DESCRIPTION OF THE DRAWINGS

The accompanying drawings, which are incorporated in and form a part of this application, illustrate embodiments of the subject matter for automated projection of global navigation satellite orbits, and together with the description, serve to explain the principles of the subject matter. Unless noted, the drawings referred to this description should be understood as not being drawn to scale.

FIG. 4 is a flow diagram of an example method of autonomous orbit projection performed within a GNSS receiver, in accordance with an embodiment.

FIG. 6 is a flow diagram of an example method for autonomous fast acquisition of a GNSS satellite, in accordance with an embodiment.

DETAILED DESCRIPTION

Figure 1A:
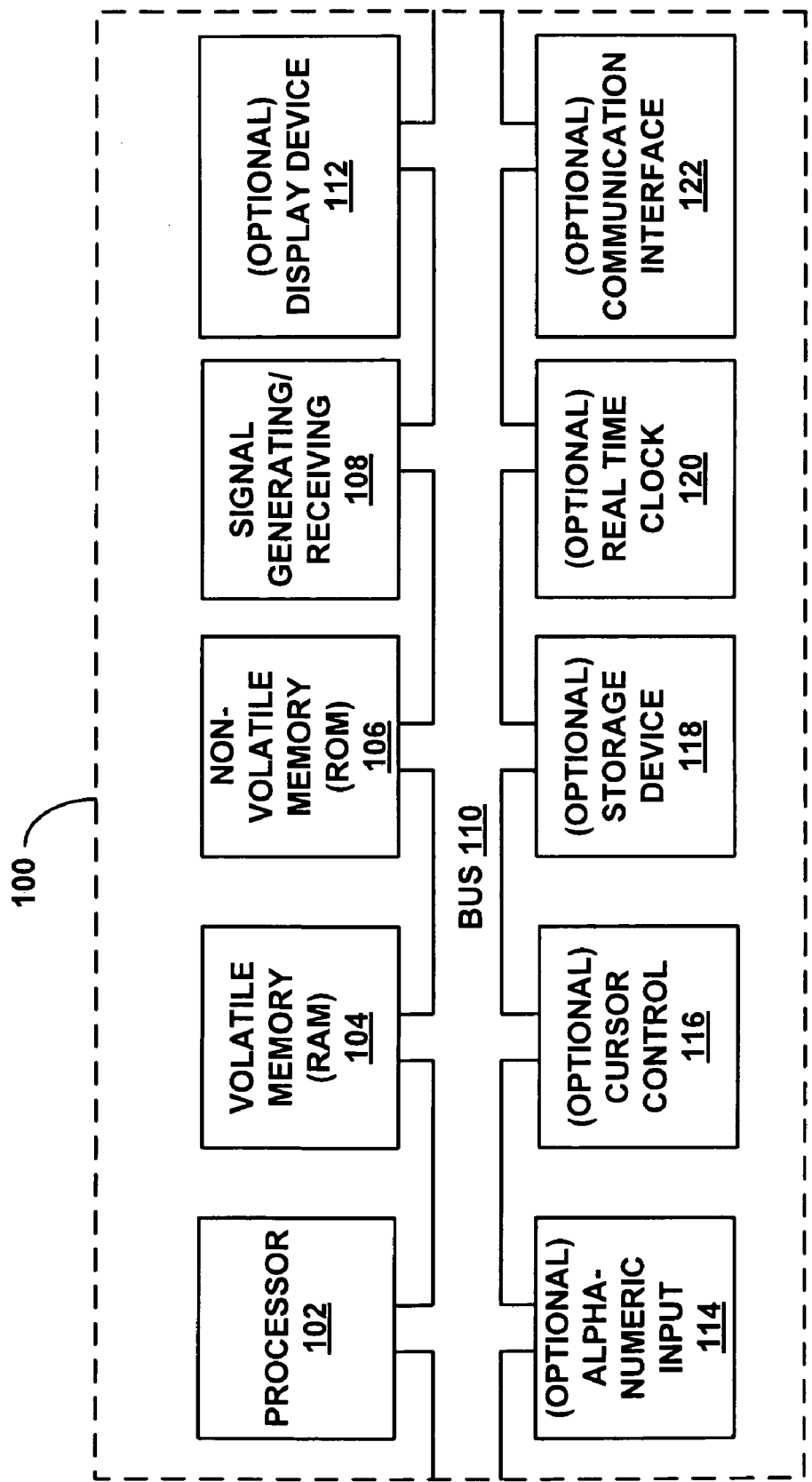
FIG. 1A is a block diagram of an example computer system used in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present detailed description, discussions utilizing terms such as "receiving," "storing," "converting," "determining," "performing," "utilizing," "transmitting," "calculating," "projecting," "associating," "acquiring," or the like, refer to the actions and processes of a computer system (such as computer system 100 of FIG. 1A), or similar electronic computing device. Computer system 100 or similar electronic computing device manipulates and transforms data represented as physical (electronic) quantities within the computer system's registers and memories into other data similarly represented as physical quantities within the computer system memories or registers or other such information storage, transmission, or display devices.

The subject matter discussed herein may be described in the general context of computer-executable instructions, such as modules, which are executed or executable by a computer. Generally, these modules include routines, programs, objects, components, data structures, etc., that perform particular tasks or implement particular abstract data types.

Overview of Discussion

The subject matter presented herein enables a Global Navigation Satellite System (GNSS) receiver to perform autonomous projection of global navigation satellite orbits and thereby to perform autonomous fast acquisition of GNSS satellites. By equipping a GNSS receiver with a robust orbit projector, a GNSS receiver able to convert otherwise stale broadcast orbit data into accurate range data can then use this range data as an input to the orbit projector. In this manner, utilizing only information received directly from GNSS satellites, the orbit projector projects orbits of one or more GNSS satellites for a period of time from several hours to several days, rather than the projected orbits of several hours or less that are existing GNSS receiver are currently capable of projecting. Such orbital projections may then used to perform fast acquisition (e.g., in 3-15 seconds) of GNSS satellites upon future initializations of the GNSS receiver. Additionally, upon acquisition of satellites, such orbit projections may be precise enough to allow immediate production of highly accurate positional information without waiting to receive a broadcast orbit from a satellite.

Discussion will begin with descriptions of an example computer system environment and a first GNSS receiver with which, or upon which, embodiments of the subject matter may operate. An example block diagram of a second GNSS receiver will be presented and described in conjunction with description of autonomous projection of GNSS orbits. An example of a Real Time Kinematics (RTK) base station which utilizes the GNSS receiver will also be presented and described in conjunction with example rover units which receive RTK updates and for other information from the RTK base station. A general description of the operation of the components of the GNSS receiver will be provided. Operation of these components will then be described in greater detail in conjunction with description of a method of autonomous orbit projection performed within a GNSS receiver and further in conjunction with description of a method for autonomous fast acquisition of a GNSS satellite.

Example Computer System Environment

With reference now to FIG. 1A, a block diagram is shown of an embodiment of an example computer system 100 which may be used in accordance with various embodiments described herein. It should be appreciated that computer system 100 is not strictly limited to being a computer system. As such, computer system 100 of the present embodiment may be well suited to be any type of computing device (e.g., a computing device utilized to perform calculations, processes, operations, and functions within a GNSS receiver, such as GNSS receiver 200 of FIG. 2). Within the discussions herein, certain processes and steps are discussed that are realized, in one embodiment, as a series of instructions (e.g., software program) that reside within computer readable memory units and are executed by a processor(s) of computer system 100. When executed, the instructions cause computer system 100 to perform specific actions and exhibit specific behavior that may be described in detail herein.

Computer system 100 of FIG. 1A comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. Signal generating and receiving device(s) 108 of the present embodiment may include wired serial adaptors, modems, and network adaptors, wireless modems, and wireless network adaptors, and other such communication technology. The signal generating and receiving device(s) 108 may work in conjunction with one or more communication interface(s) 122 for coupling information to and/or from computer system 100. Communication interface(s) 122 may include a serial port, a parallel port, a Universal Serial Bus (USB), and an Ethernet port, an antenna, or other input/output interface. Communication interface(s) 122 may be utilized to physically, electrically, optically, or wirelessly couple computer system 100 with another device such as a cellular telephone, Global System for Mobile communications (GSM) modem, or computer system.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computer system 100 of FIG. 1A may also include one or more optional computer usable data storage devices 118 such as a magnetic or optical disk and disk drive (e.g., hard drive, floppy diskette, Compact Disk-Read Only Memory (CD-ROM), Digital Versatile Disk (DVD)) coupled with bus 110 for storing information and/or computer executable instructions. An optional display device 112 may be coupled to bus 110 of computer system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user. In one embodiment a real time clock 120 is incorporated in computer system 100. For example, in an embodiment where computer system 100 performs some functions of a GNSS receiver, real time clock 120 is used in conjunction with an orbit for a GNSS satellite to assist computer system 100 in quickly determining the proper frequency to tune to in order to receive information being broadcast from the GNSS satellite.

First Example GNSS Receiver

Figure 1B:
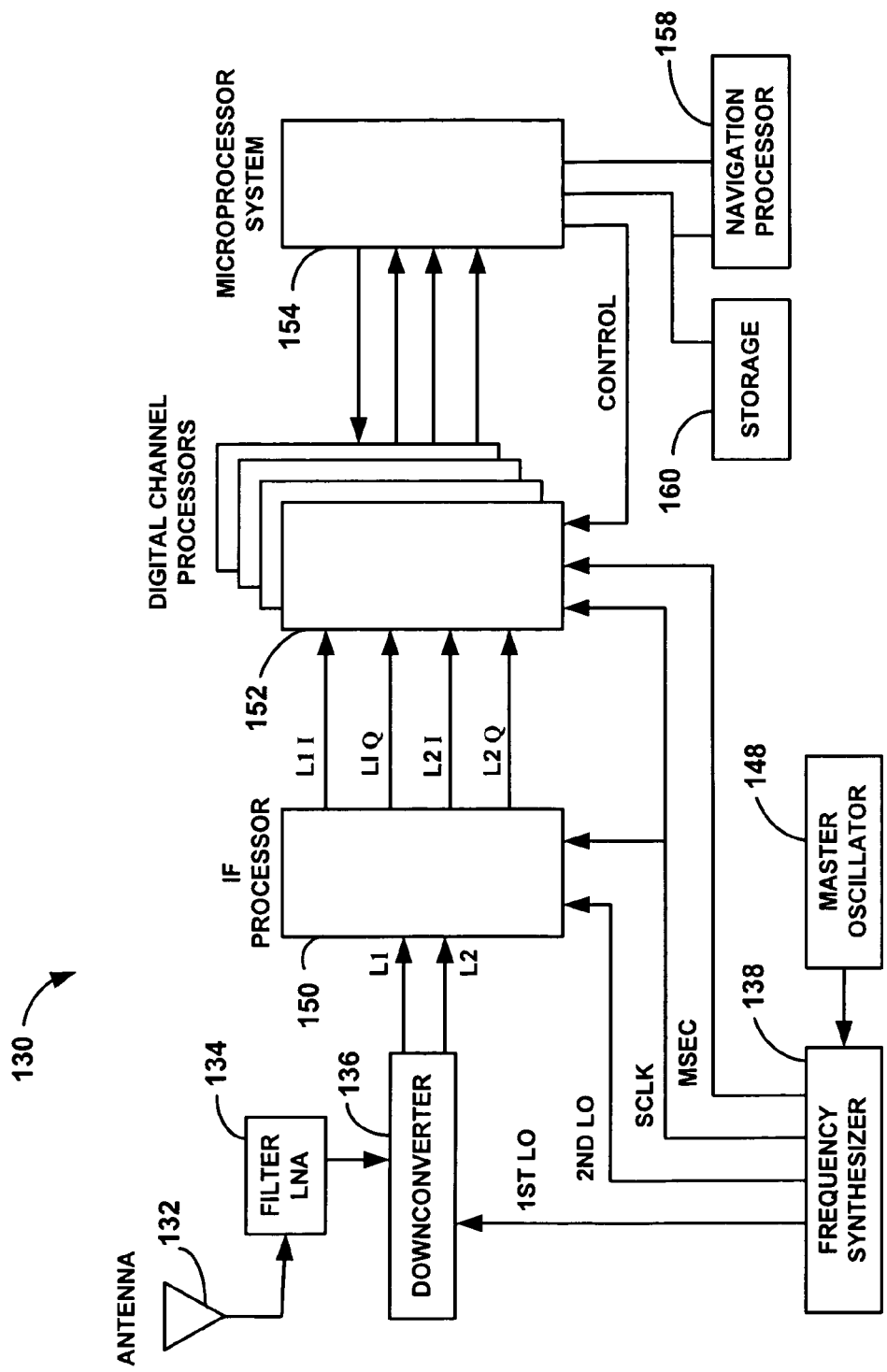
FIG. 1B is block diagram of a first example Global Navigation Satellite System (GNSS) receiver used in accordance with an embodiment

With reference now to FIG. 1B, a block diagram is shown of an embodiment of an example GNSS receiver which may be used in accordance with various embodiments described herein. In particular, FIG. 1B illustrates a block diagram of a GNSS receiver in the form of a general purpose GPS receiver 130 capable of demodulation of the L1 and/or L2 signal(s) received from one or more GPS satellites. A more detailed discussion of the function of a receiver such as GPS receiver 130 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 130 of FIG. 1B.

In FIG. 1B, received L1 and L2 signal are generated by at least one GPS satellite. Each GPS satellite generates different signal L1 and L2 signals and they are processed by different digital channel processors 152 which operate in the same way as one another. FIG. 1B shows GPS signals (L1=1575.42 MHz, L2=1227.60 MHz) entering GPS receiver 130 through a dual frequency antenna 132. Antenna 132 may be a magnetically mountable model commercially available from Trimble Navigation of Sunnyvale, Calif. Master oscillator 148 provides the reference oscillator which drives all other clocks in the system. Frequency synthesizer 138 takes the output of master oscillator 148 and generates important clock and local oscillator frequencies used throughout the system. For example, in one embodiment frequency synthesizer 138 generates several timing signals such as a 1st local oscillator signal LO1 at 1400 MHz, a 2nd local oscillator signal LO2 at 175 MHz, a (sampling clock) SCLK signal at 25 MHz, and a MSEC (millisecond) signal used by the system as a measurement of local reference time.

A filter/LNA (Low Noise Amplifier) 134 performs filtering and low noise amplification of both L1 and L2 signals. The noise figure of GPS receiver 130 is dictated by the performance of the filter/LNA combination. The downconvertor 136 mixes both L1 and L2 signals in frequency down to approximately 175 MHz and outputs the analogue L1 and L2 signals into an IF (intermediate frequency) processor 150. IF processor 150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 152 inputs the digitally sampled L1 and L2 inphase and quadrature signals. All digital channel processors 152 are typically are identical by design and typically operate on identical input samples. Each digital channel processor 152 is designed to digitally track the L1 and L2 signals produced by one satellite by tracking code and carrier signals and to from code and carrier phase measurements in conjunction with the microprocessor system 154. One digital channel processor 152 is capable of tracking one satellite in both L1 and L2 channels. Microprocessor system 154 is a general purpose computing device (such as computer system 100 of FIG. 1A) which facilitates tracking and measurements processes, providing pseudorange and carrier phase measurements for a navigation processor 158. In one embodiment, microprocessor system 154 provides signals to control the operation of one or more digital channel processors 152. Navigation processor 158 performs the higher level function of combining measurements in such a way as to produce position, velocity and time information for the differential and surveying functions. Storage 160 is coupled with navigation processor 158 and microprocessor system 154. It is appreciated that storage 160 may comprise a volatile or non-volatile storage such as a RAM or ROM, or some other computer readable memory device or media. Some functions performed by navigation processor 158, in accordance with autonomous projection of GNSS satellite orbits, are described by the components and functions shown and discussed in conjunction with FIG. 2.

Second Example GNSS Receiver

Figure 2:
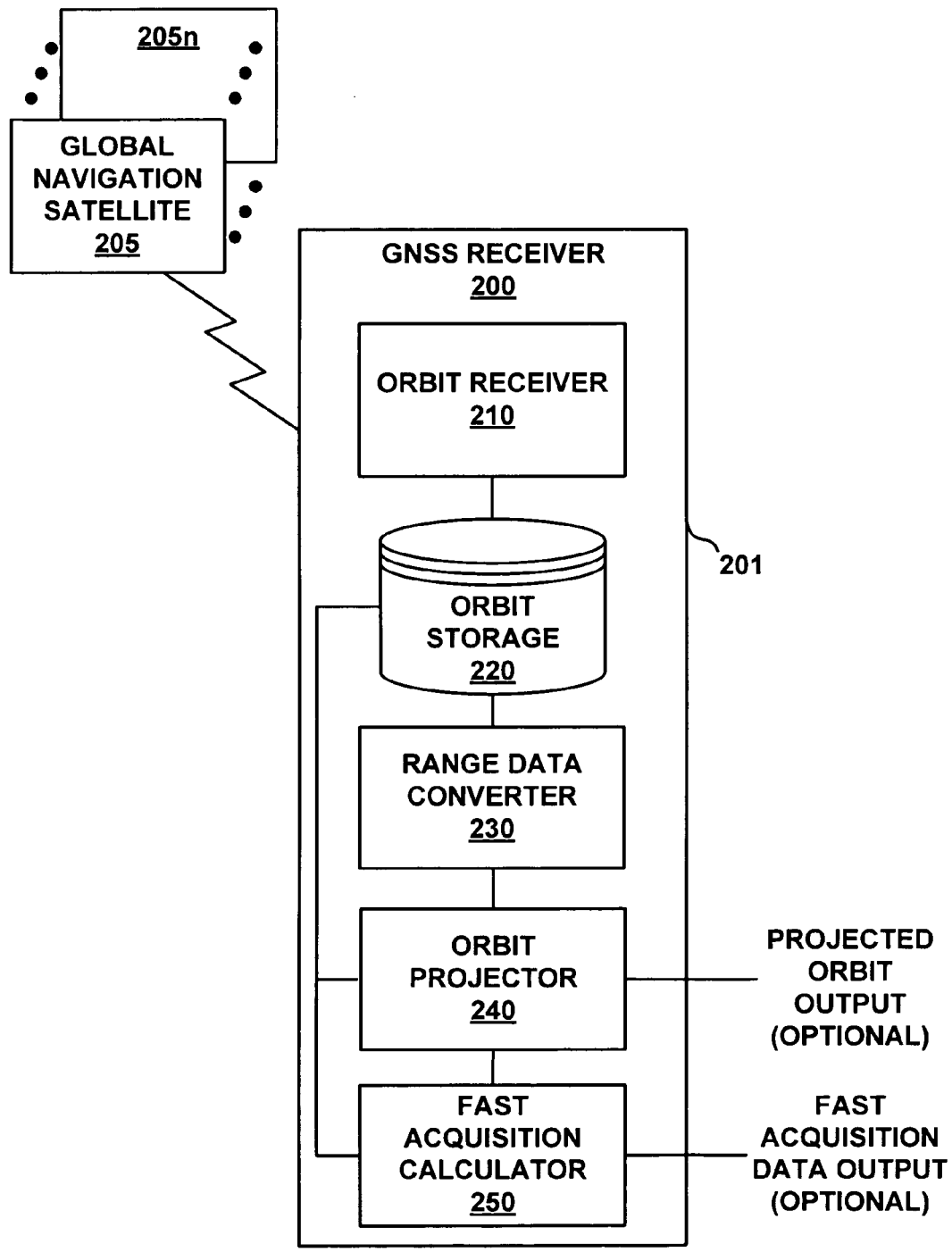
FIG. 2 is a block diagram of a second example Global Navigation Satellite System (GNSS) receiver, in accordance with an embodiment.

Referring now to FIG. 2, a block diagram is shown of an example GNSS receiver 200. The block diagram is simplified in that it only shows portions which are pertinent to the discussion herein. It is appreciated that a GNSS receiver typically includes other functions/components; however, these have been omitted from FIG. 2 in the interest of clarity of discussion. GNSS receiver 200 is a positioning and navigation device which also comprises an orbit receiver 210, an orbit storage 220, a range data converter 230, an orbit projector 240, and a fast acquisition calculator 250, which are communicatively coupled with one another for exchange of information. As will be further described herein, GNSS receiver 200 comprises a portion of a system for autonomous projection of a GNSS satellite orbit. In one embodiment some or all of the components of GNSS receiver 200 are disposed within a common housing 201. Common housing 201 can be, for example, a housing of a hand holdable or vehicle mountable GNSS receiver and/or a housing of a surveying instrument.

The general operation of a GNSS receiver, in so far as receiving broadcasts from GNSS satellites, is well known and thus will be described only briefly to provide context for further discussion. In brief, GNSS receiver 200 receives broadcasts from a plurality of global navigation satellites (205-205n) that may be a part of one or more Global Navigation Satellite Systems. For example, in various embodiments, the positioning capabilities of GNSS receiver 200 may be based on signals from GPS (Global Positioning System) satellites, GLObal NAvigation Satellite System (GLONASS) satellites, Galileo satellites (when operational), Compass satellites (when operational), WAAS (wide area augmentation service), European Geostationary Navigation Overlay Service (EGNOS) (when operational), and the like. Based upon these signals, GNSS receiver 200 determines timing, positional, and/or navigational information. It is appreciated that GNSS receiver 200 may be a GPS receiver, such as a handheld GPS receiver, which may be equipped with a display device 112 for viewing the determined timing, positional, and/or navigational information. In one embodiment, as described herein, GNSS receiver 200 may also be incorporated in a base station, such as Real Time Kinematics base station 310 of FIG. 3.

Orbit receiver 210 is disposed within the GNSS receiver 200 and, in one embodiment, is disposed within the common housing 201 associated with GNSS receiver 200. Orbit receiver 210 receives over the air transmission of broadcast orbits that are individually transmitted from a plurality of GNSS satellites (e.g., 205-205n). Thus, during the operation of GNSS receiver 200 and while each particular satellite in a GNSS is in view, the distinct broadcast orbit transmitted from each satellite is received by orbit receiver 210. Orbit receiver 210 couples received orbits to orbit storage 220, where they are stored for future use. It is appreciated that orbit storage 220 may comprise a volatile or non-volatile storage such as a RAM or ROM, or some other computer readable memory device or media.

For example, during operation of GNSS receiver 200, orbit receiver 210 receives broadcast orbits over the air in the form of transmissions from GPS satellites (among others). In the case of GPS satellites, a new, distinct broadcast orbit for each satellite is transmitted repeatedly over a span of two hours and then updated on a two hour cycle. After this two hour cycle, another distinct orbit is broadcast repeatedly. A broadcast orbit, otherwise known as broadcast ephemeris, comprises 3 data blocks each of 6 seconds length, and each block is repeated at 30 second intervals. To receive a broadcast orbit from a GPS satellite, GNSS receiver 200 must track each data block must be continuously for 6 seconds with no data or signal dropouts. Further, decoding the data blocks becomes difficult or impossible with signal levels drop below −145 dBm, something that can commonly occur indoors or in city conditions (e.g., lots of buildings). Upon power up, full decoding of a broadcast orbit in clear-view conditions typically takes a receiver, such as GNSS receiver 200, between 19.2 seconds and 37.2 seconds depending upon what point the broadcast is in when tracking and reception begins.

Considering the example of a GPS satellite. A broadcast orbit for a GPS satellite constitutes parameters from the transmitted satellite data message which allow a GNSS receiver to determine where the U.S. Air Force says the GPS satellite will be located (within its orbit), as a function of time. This data is valid for approximately four hours from its initial broadcast and is typically replaced by new data two hours from its initial broadcast from a given GPS satellite. The new data is likewise valid for four hours, but it replaced after two hours. This process continually repeats on a two hour cycle as described above.

Orbit storage 220 is coupled with orbit receiver 210 and, in one embodiment, is disposed within the same common housing 201 associated with GNSS receiver 200. In some embodiments, orbit storage 220 is comprised of volatile memory 104, non-volatile memory 106, storage device 118, or some combination thereof. Orbit storage 220 stores collections of distinct broadcast orbits which are received over time by orbit receiver 210 for each of a plurality of GNSS satellites (e.g., 205-205n). A single collection of these collections of broadcast orbits comprises a plurality of distinct broadcast orbits for a particular GNSS satellite, such a collection having been received by orbit receiver 210 via over the air transmissions from the particular GNSS satellite. For example, orbit storage 220 may store 5, 10, 100 or more distinct broadcast orbits received over time from a particular GNSS satellite 205. Likewise, orbit storage 220 may store similar collections of received broadcast orbits for a plurality of GNSS satellites (e.g., 205-205n). For example, in one embodiment, orbit storage 220 stores a collection of distinct broadcast orbits for each operational satellite in the GPS constellation.

Range data converter 230 is coupled with orbit receiver 210 and, in one embodiment, is disposed within the same common housing 201 associated with GNSS receiver 200. Range data converter 230 converts a plurality of the stored broadcast orbits in a collection of broadcast orbits into a time series of range data (e.g., a time series of position and/or position and velocity range data) for a GNSS satellite which the collection of broadcast orbits is associated with. It is appreciated that this process for range data conversion is carried out using well known equations and methods for computing range data from satellite orbital data. An explanation of this process, with examples, is given in Chapter 21, pp 551, by Thomas Yunck, Vol. II, Global Positioning System Theory and Applications, 1996, published by the American Institute of Aeronautics and Astronautics, Inc., ISBN 1-56347-107-8.

For example, in one embodiment, a distinct broadcast orbit may be converted into x, y, and z coordinates referenced from a particular location such as a center point of the earth. These coordinates constitute one instantiation of range data d determined from a broadcast orbit. This converting may be performed at one or more particular times (e.g., $t_1, \ldots, t_n$) within the validity window of the distinct broadcast orbit. This will generate a time series of data points. A time series is a sequence of data points $d_i$ (or measurements or observations) coming at time $t_i$ often spaced at constant time intervals $\Delta t$. However, it is not a requirement that the time between data points is constant and it would be a time series in case where the data points were not at constant intervals. By repeating this calculation of range data to create a series of, for example 5, 10, 100, or more data points, a time series of points of range data for (e.g., satellite location at particular times) a particular GNSS satellite is developed.

A simplified example of a time series can be garnered from measurements made regarding the velocity of a ball which has been thrown straight upward. Initially at $t_o$ the ball has an upward velocity of $v_0$=100 km/sec where v (velocity) is used rather than d (data) because v is more descriptive. Later at time $t_1$ it might have an upward velocity of $v_1$=0 km/sec. Yet later at $t_2$ it might have an upward velocity of $v_2$=−60 km/sec. This is an example of a time series of data. In this example the terms velocity and upward velocity are synonymous.

If an adequate number of data points ($t_i$, $d_i$) exist in a time series, a model can be force fit to it or derived from it. In the ball example, and assuming more points, a history of velocities is represented by the time series ($t_i$, $d_i$) which would enable modeling velocity for this example problem as a trial model of the time series.

Similarly, with respect to a GNSS satellite, a time series of x, y, and z positional coordinates can be generated by performing a calculations to convert a distinct broadcast orbit into range data at intervals, such as every ten minutes, during the period of validity (e.g., a four hour window) of the particular distinct broadcast orbit. This process can then be repeated for other distinct broadcast orbits in the collection of broadcast orbits for a particular GNSS satellite such that the sample space of the time series of x, y, z coordinates is increased for a GNSS satellite. It is appreciated that larger or smaller intervals than ten minutes can be used and that there may be gaps or non-regular intervals in a time series of range data generated in this fashion. This process can also be repeated for other collections of distinct broadcast orbits which are associated with additional GNSS satellites. Further, in some embodiments, a velocity component (e.g., Vx, Vy, and Vz) may also be computed in association with each x, y, and z positional coordinate. In one embodiment, after conversion, a time series, such as 10, 100, 1000, or more instances of range data is stored in orbit storage 220 or similar storage for future use by orbit projector 240. In another embodiment the time series of range data is provided as an input to orbit projector 240. For example, in one embodiment the time series of range data which is stored for a particular GNSS satellite constitutes 10 instances of range determined at intervals of 30 minutes. This time series of range data is then used by orbit projector 240 to develop a model of the orbit of the particular GNSS satellite.

Orbit projector 240 is coupled with range data converter 230 and, in one embodiment, is disposed within the same common housing 201 associated with GNSS receiver 200. Orbit projector 240 accepts a time series of range data calculated by range data converter 230 and uses this range data as an input for use in determining a projected orbit for a GNSS satellite. Orbit projector 240 projects highly detailed orbits in this manner which are accurate to tens of meters for a span of several days, and to approximately 10 meters or less over a span of 0 to 2 days. This process can then be repeated for additional GNSS satellites. In one embodiment, a GNSS receiver, such as GNSS receiver 200 transmits projected orbit for one or more GNSS satellites to a second GNSS receiver to assist in performance of fast acquisition of one or more GNSS satellites at the second GNSS receiver.

For example, in an evaluation of the orbit projection techniques described herein, a GNSS satellite orbit was projected with the orbit projection techniques herein and then compared to a satellite orbit predicted with a precise orbit for a GNSS satellite. A precise orbit is a very accurate orbit, generally accurate to a couple meters or less, but often accurate to within 10 centimeters or less of the actual position of a GNSS satellite. In the time period between 0 and 50 hours, the orbit projected with the techniques described herein varied by 10 meters or less from the prediction of the precise orbit. In this same evaluation, after 50 hours, the prediction errors of the projected orbit (mainly along track) began to increase in comparison to the precise orbit. However, the rate of error increased only to about 20 meters or less at 100 hours and to 60 meters or less at 170 hours.

Such accurate orbit projections have not previously been performed in the manner described herein, nor have they been performed within a GNSS receiver. However, techniques and programs for performing accurate orbit projections from range data are generally known, and thus are not described in detail herein. For example, such techniques which input real data and create Keplarian orbital parameters (or extended sets of orbital parameters) are utilized by orbit projection programs including, but not limited to: the GPS-Inferred Positioning SYstem and Orbit Analysis SImulation Software (GIPSY-OASIS) orbit projector of the Jet Propulsion Laboratory; the Advanced High Precision Orbit Propagator (Advanced HPOP) software available from MicroCOSM Inc. of Hawthorne, Calif.; the Orbit Mensuration and Navigation Improvement System (OMNIS) satellite orbit generation program of the National Geospatial-Intelligence Agency (NGA); the Goddard Trajectory Determination System (GTDS) of the Goddard Space Flight Center; the GEODYN orbit determination and geodetic parameter estimation software of the National Aeronautics and Space Administration (NASA) Goddard Flight Test Center; the Trace, Aerospace Orbit Determination Program of the Aerospace Corporation; and the Multi-Satellite Orbit Determination Program (MSODP) of the University of Texas at Austin. Source code for some of these programs, such as the GEODYN program, is readily available to the public for use and/or modification.

Orbit projector 240 is located in GNSS receiver 200 and constitutes robust orbit projection functionality which is the same as or equivalent to the capabilities of one or more of the aforementioned orbit projection programs or that of one of many other commercially available orbit projection programs. In some instances, the functionality is tailored to include only the specific functionality for projecting orbits using a time series of range data and parameters of a particular model and/or models which substantially affect the orbit of a GNSS satellite around the earth. Orbit projector 240 inputs real data in the form of the time series of range data and outputs a new orbital model which is used to predict the actual location (projected orbit) of a GNSS satellite in the near future (e.g., a few seconds in the future to several days into the future). This new orbital model is stored and used instead of the using the near future orbital parameter information that is resident in a broadcast orbit contained in the satellite data message received from a GNSS satellite. This new orbital model is updated, for example periodically and/or continually. This new orbital model alleviates the need to have a separate communications link to deliver an accurate orbital projection to a GNSS receiver, such as GNSS receiver 200.

It is noted that the United States Government, for example, could accomplish a similar result by providing a longer lasting (valid for a longer period of time) broadcast orbit in the satellite data message transmitted from GPS satellite. However, the content and format of the satellite data message broadcast from a GPS satellite is rigidly dictated by GPS Interface Control Document (ICD) ICD-200 revision C and the requirement for a broadcast which is decodable by a large number of existing GPS/GNSS receivers. ICD-200 is a publicly available document which can be accessed from many sources, including download from the Internet based Navigation Center (Navcen) maintained by the United States Department of Homeland Security and the United States Coast Guard. Because of the number of users/receivers which depend on the current GPS broadcasts, the act of simply coordinating a change to the broadcast orbit in a GPS satellite data message typically takes years to accomplish. Thus, there is a real need for this kind of capability, resident in the GNSS receiver.

Fast acquisition calculator 250 is coupled with orbit projector 240 and, in one embodiment, is disposed within the same common housing 201 associated with GNSS receiver 200. In one embodiment, fast acquisition calculator 250 utilizes one or more projected orbits of GNSS satellites to determine available satellites based upon a time and a known or approximate location of GNSS receiver 200. In one embodiment, fast acquisition calculator 250 utilizes a projected orbit to determine a tuning frequency for tuning of GNSS receiver 200 to a broadcast from a GNSS satellite that the projected orbit is associated with. This reduces or eliminates the need to search a variety of frequencies over the span of Doppler shifted frequencies which are possible depending on the location of the GNSS satellite relative to GNSS receiver 200. Such tuning frequency determination can be repeated for a plurality of GNSS satellites using respective projected orbits for a plurality of GNSS satellites. In one embodiment, GNSS receiver 200 may also transmit fast acquisition data, such as GNSS satellite availability data or tuning frequency data (for tuning directly to a broadcast of one or more available GNSS satellites with out the need to step through a variety of possible reception frequencies per GNSS satellite) to a second GNSS receiver to assist in performance of fast acquisition of a GNSS satellite or satellites at the second GNSS receiver.

Performing a fast acquisition with a projected orbit eliminates the requirement to track and decode a broadcast orbit before generating positioning data from code and carrier measurements. Thus, 19.2-37.2 seconds of acquisition time is eliminated. The ability to perform fast acquisition using projected satellite orbits in this manner is similar to the ability to perform fast acquisition from stored ephemeris of a broadcast satellite orbit which is still valid. However, a stored satellite broadcast orbit will become stale within 4 hours from its initial broadcast, and may be of little or no use for fast acquisition. Conversely, a satellite orbit projected by the techniques described herein often remains valid to perform fast acquisition for several days. The techniques described herein for projecting orbits and performing fast acquisition assist with decreased time to a position fix and with other common issues such as indoor navigation, urban navigation, and new satellite acquisition.

With respect to acquisition time, in a clear-view situation and with parameters of a projected orbit and a time from real time clock 120 accurate to within a few seconds, GNSS receiver 200 generates first position fixes as soon as pseudoranges from four or five satellites are measured or obtained. In one embodiment, for example, a position fix can be obtained in this manner in 3.1 seconds. Though this may not seem like a huge improvement, it matters in many scenarios. For example, when a fire engine leaves from a fire house a position fix will be generated quickly enough, after power up of GNSS receiver 200, to inform the driver whether she should turn left or right. The same scenario, without the emergency implications, applies to powering up GNSS receiver 200 for turn-by-turn directions in a civilian automobile.

With respect to indoor navigation, decoding of broadcast orbits from a satellite breaks down when signal strength decreases to below approximately −146 dBm. Such breakdowns often happen when a GNSS receiver is inside a building or structure. However, useful pseudoranges and positional fixes are obtainable with signal strength well below these levels, down to around −160 dBm in good conditions. Thus, in indoor and other conditions where signal levels allow for obtaining pseudoranges, but not for the decoding of satellite broadcast ephemeris, GNSS receiver 200 generates indoor position fixes using projected orbits and the available pseudoranges.

With respect to urban navigation, signals from GNSS satellites often appear to flicker from the view point of a GNSS receiver. This is due to numerous blockages in an urban environment. Because of such flickering, the tracking intervals needed to decode the broadcast orbit for a GNSS satellite (e.g., 6 seconds for a GPS satellite) may not be available for several minutes after power up of a GNSS receiver. However, in such situations, GNSS receiver 200 generates position fixes using projected orbits and pseudoranges which are obtainable.

With respect to new satellite acquisition, after the first fix has been made with three or four GNSS satellites, GNSS receiver 200 can search for and acquire new GNSS satellites very quickly at very low signal levels. The mechanism for this is as follows: the first fix gives very accurate position and time; with the projected orbits in memory for unacquired satellites, GNSS receiver 200 is able to predict nearly exact timing (often referred to as "chip position") of the incoming signals of the unacquired GNSS satellites. Ordinarily, low signal searches are time-consuming. However, because GNSS receiver 200 is able to nearly exactly determine the chip position of unacquired GNSS satellite signals, this reduces the time to acquire additional GNSS satellites and speeds the handoff to a tracking loop of GNSS receiver 200.

It is appreciated that this type of fast acquisition of GNSS satellites is compatible with and can be used in conjunction with the standard kinds of position solutions to perform navigation or position determination using a GNSS receiver. For example, in one embodiment, an orbital location predicted in the manner described herein for a particular time $t_p$ is used as a substitute for actual or undecodable/unreceived broadcast orbit data for the same particular time, $t_p$. This substitution can be performed in addition to and/or in conjunction with conventional corrections methods such as DGPS (Differential GPS) or RTK (Real Time Kinematics).

Example Real Time Kinematics (RTK) Base Station and Rovers

Figure 3:
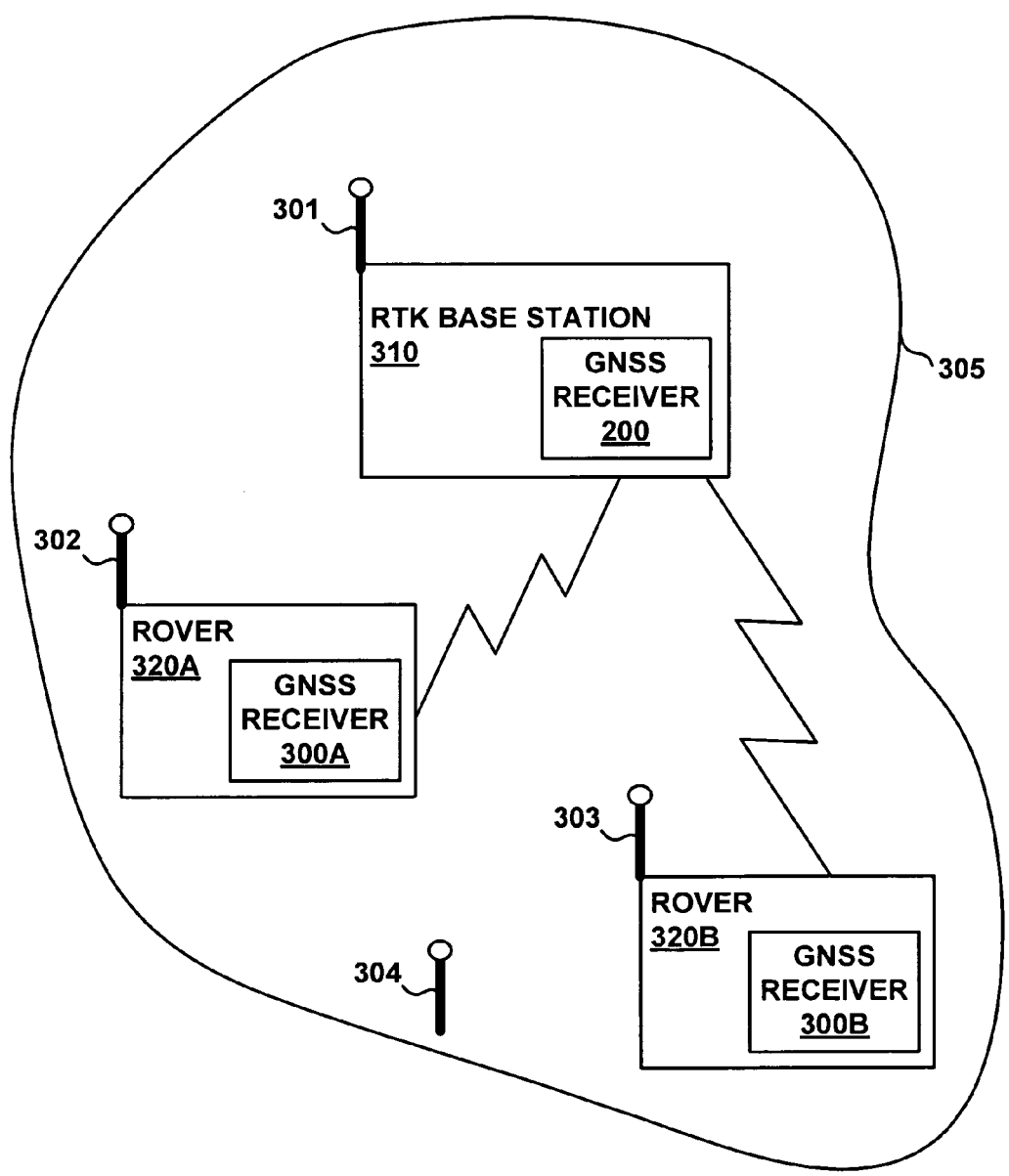
FIG. 3 shows an example Real Time Kinematics (RTK) base station and rovers in use on an example job site, in accordance with an embodiment.

FIG. 3 shows an example Real Time Kinematics (RTK) base station 310 and rovers 320A and 320B in use on an example job site 305, in accordance with one embodiment. As shown in FIG. 3, RTK base station 310 is placed at a known location 301, such as a surveyed location. Rover units 320A and 320B, at locations 302 and 303 respectively, then receive GNSS RTK error correction information from RTK base station 310 such that they may perform accurate positional measurements (e.g., measurements accurate to within two centimeters or less) at other locations (e.g., 302, 303, 304) on job site 305 while located within a range of several kilometers of RTK base station 310.

As shown in FIG. 3, in one embodiment, RTK base station 310 incorporates GNSS receiver 200 such that it may perform autonomous projection of GNSS satellite orbits. The R6 series of GNSS Base Stations and Rovers available from Trimble Navigation Limited of Sunnyvale, Calif., provides one example of the types of base station and rover units which may incorporate a GNSS receiver, such as GNSS receiver 200, for the purpose of purpose of carrying out autonomous projection of GNSS satellite orbits as described herein. In one embodiment, RTK base station 310 broadcasts projected orbits and/or fast acquisition data (generated by GNSS receiver 200), to one or more GNSS receivers (e.g., 300A, 300B) of rover units (e.g., 320A, 320B) which receive RTK updates from RTK base station 310. Such orbit projections and/or fast acquisition data are used by the rover units to perform a fast and precise acquisition of GNSS satellites following a initialization (e.g., a startup or re-initialization which requires reacquisition of navigation satellites).

Example Methods of Operation

The above discussion has set forth the operation of some example systems, devices, and methods of operation of embodiments described herein. With reference to FIGS. 4 and 6 and flow diagrams 400 and 600, example steps used by various embodiments of the subject matter have been illustrated. Flow diagrams 400 and 600 describe methods that, in various embodiments, are carried out by a processor under the control of computer-readable and computer-executable instructions. Thus, in some embodiments, these methods are implemented via a computer, such as computer system 100 of FIG. 1A, microprocessor system 154 of FIG. 1B, and/or navigation processor 158 of FIG. 1B. The computer-readable and computer-executable instructions reside, for example, in data storage features such as computer usable/readable volatile memory 104, computer usable/readable non-volatile memory 106, or computer useable/readable media of storage device 118 of computer system 100 (all shown in FIG. 1A) or storage 160 shown in FIG. 1B. The computer-readable and computer-executable instructions, which may reside on computer useable/readable media, are used to control or operate in conjunction with, for example, processor 102 of FIG. 1A, microprocessor system 154 of FIG. 1B, and/or navigation processor 158 of FIG. 1B. Although specific steps are disclosed in flow diagrams 400 and 600, such steps are examples. That is, embodiments are well suited to performing various other steps or variations of the steps recited. It is appreciated that the steps in flow diagrams 400 and 600 may be performed in an order different than presented, and that not all of the steps in flow diagrams 400 and 600 may be performed.

Example Method of Autonomous Orbit Projection within a GNSS Receiver

FIG. 4 illustrates a flow diagram 400 of an example method of autonomous orbit projection which may be performed within a GNSS receiver, such as GNSS receiver 200, in accordance with one embodiment. The operation of the method of flow diagram 400 is described with reference to components and functionality GNSS receiver 200 of FIG. 2 and with reference to elements of the block diagram of satellite orbits and range data conversion shown in FIG. 5.

At 410 of flow diagram 400, in one embodiment, the method receives distinct broadcast orbits from a GNSS satellite. The distinct broadcast orbits are received in a GNSS receiver, such as GNSS receiver 200, over time during operation of the GNSS receiver. For example, if GNSS receiver 200 is turned on constantly for a period of 30 days, orbit receiver 210 will receive a large number of distinct broadcast orbits from a particular global navigation satellite, such as a GPS satellite, a GLONASS satellite, or other navigation satellite. Likewise, if GNSS receiver 200 is turned on for a period of 12 hours a day Monday through Friday during a work week, orbit receiver 210 will receive several distinct broadcast orbits from a particular GNSS satellite. It is appreciated that the receiving of distinct broadcast orbits also encompasses orbit receiver 210 receiving a plurality of distinct broadcast orbits from a plurality of GNSS satellites. For example, over time, GNSS receiver 200 may receive distinct broadcast orbits from every operational satellite in the GPS constellation. Likewise, GNSS receiver may additionally or alternatively receive distinct broadcast orbits from a plurality of satellites, such as GLONASS satellites, in other global navigation systems.

Figure 5:
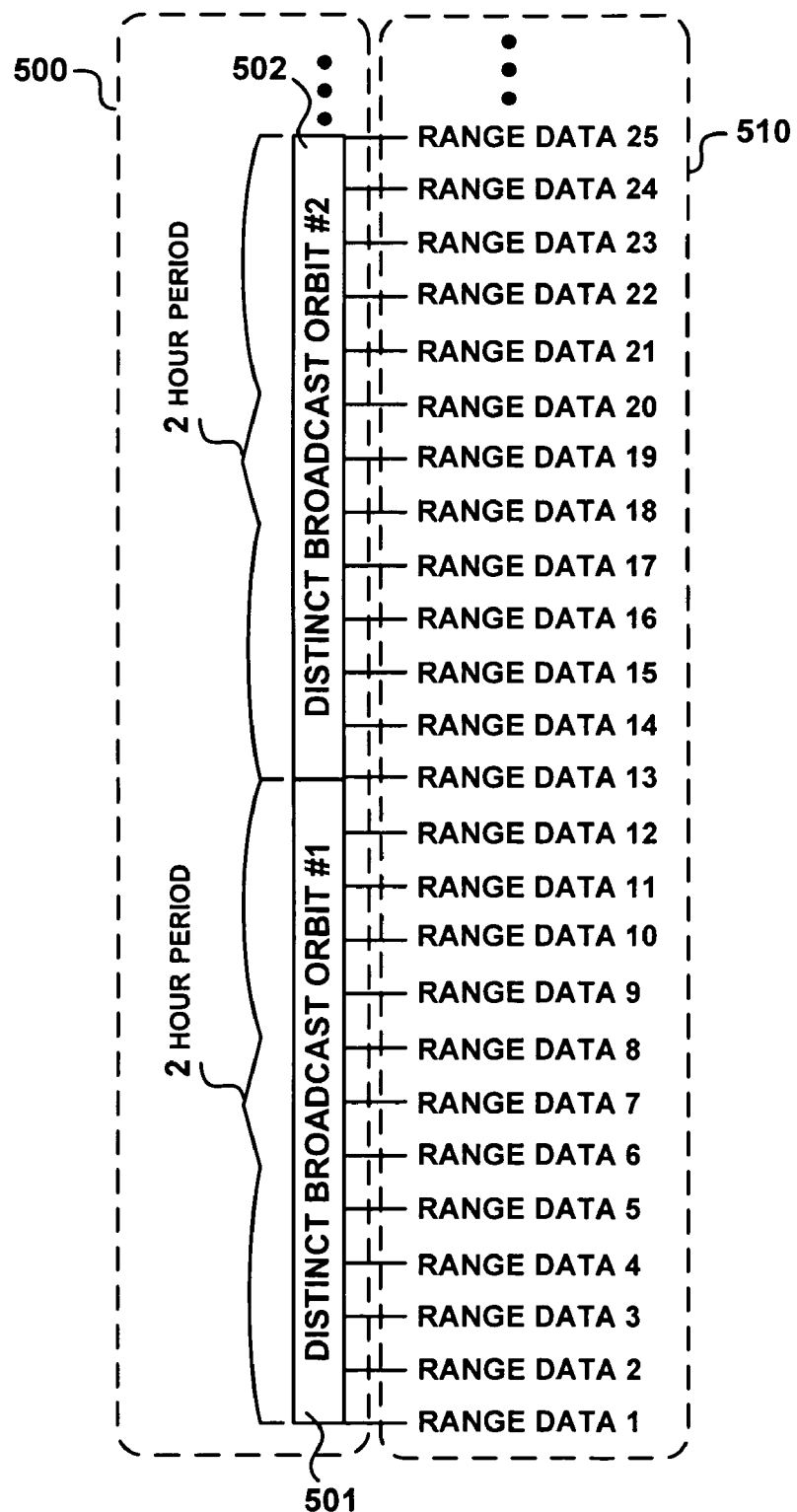
FIG. 5 is a block diagram of a time series of range data generated in accordance with an embodiment.

FIG. 5 is a block diagram of a time series of range data 510 generated in accordance with one embodiment. FIG. 5 also shows two distinct broadcast orbits (501 and 502) which were transmitted repeatedly over consecutive two hour time periods from a particular satellite and which have been received by orbit receiver 210.

At 420 of flow diagram 400, in one embodiment, the method stores a plurality of the received distinct broadcast orbits within the GNSS receiver. For example, after being received by orbit receiver 210, the received distinct broadcast orbits (e.g., 501, 502, and the like) are coupled to orbit storage 220, where they are stored as a collection of distinct broadcast orbits. In orbit storage 220 each collection of distinct broadcast orbits is associated with the particular satellite which transmitted the distinct broadcast orbits that comprise the collection.

Referring again to FIG. 5, each distinct broadcast orbit (501, 502, and the like) received from a particular satellite vehicle (e.g., GPS satellite vehicle number 60) is saved in orbit storage 220 as part of a collection 500 of distinct broadcast orbits that is associated with that particular satellite. In one embodiment, distinct broadcast orbits are saved by orbit storage 220 for a particular amount of time, such as two weeks, and then overwritten or deleted.

It is appreciated that the storing of distinct broadcast orbits inside a GNSS receiver, such as GNSS receiver 200, also encompasses orbit storage 220 storing a plurality of distinct broadcast orbits from each of a plurality of GNSS satellites. For example, over time, GNSS receiver 200 may receive and store within orbit storage 220 one or more distinct broadcast orbits from every operational satellite in the GPS constellation. In such a manner a collection of distinct broadcast orbits may be stored for each of a plurality of navigation satellites from which such broadcast orbits are received. Likewise, GNSS receiver may additionally or alternatively receive and store within orbit storage 220 one or more distinct broadcast orbits from a plurality of satellites, such as GLONASS satellites, in other global navigation systems.

At 430 of flow diagram 400, in one embodiment, the method converts a plurality of the stored broadcast orbits into a time series of range data for the GNSS satellite from which the broadcast orbits were transmitted. The converting is performed within the GNSS receiver. For example, in one embodiment, range data converter 230 converts one or more distinct broadcast orbits of a collection stored within orbit storage 220 into a time series of range data. It is appreciated that in this same manner, range data converter 230 may also convert a plurality of such stored distinct broadcast orbits from each a plurality of GNSS satellites into time serialized range data for each of the plurality of GNSS satellites.

With reference again to FIG. 5, in one embodiment, each broadcast orbit stored in collection 500 is converted into range data at repeating intervals, such as ten minute intervals over all or portion of a period of validity of the orbit. Thus if distinct broadcast orbit #1 (501) is valid for a period of four hours, range data converter 230 may create a time series of range data from that broadcast orbit by calculating range data for the satellite (e.g., GPS satellite vehicle 60) which transmitted it, by calculating the range data for the satellite a certain number of times for the distinct orbit. Range data converter 230 repeats this type of calculation of range data for some or all of the distinct orbits in collection 500. Likewise range data converter 230 also performs this range data conversion for other collections of distinct broadcast orbits which are associated with other satellites.

With specific reference to the example illustrated by FIG. 5, consecutive distinct broadcast orbits (501, 502) have been received and stored as part of collection 500. Although each of distinct broadcast orbits (501, 502) may be valid for a period of four hours, range data has only been converted over a period of two hours for broadcast orbit 501, in order to prevent overlap with range data converted from distinct broadcast orbit 502. As can be seen, range data 1 through range data 12 were calculated by range data converter 230 at approximately ten minute intervals over a two hour span associated with distinct broadcast orbit #1 (501). Likewise, range data 13 through range data 25 are calculated at ten minute intervals associated with distinct broadcast orbit #2 (502). Due to the four hour period of validity, is appreciated that in one embodiment, additional range data could be calculated at ten minute intervals for two more hours for either or both of the distinct broadcast orbits (501, 502) or other broadcast orbits of collection 500. Time series of range data 510 is comprised of range data 1 through range data 25, along with additional range data calculated from other distinct broadcast orbits of collection 500. In this manner, range data converter 230 can convert a plurality of distinct stored broadcast orbits from each of a plurality of GNSS satellites into time serialized range data for each of the plurality of GNSS satellites. It is appreciated that such range data conversion can be performed upon receipt of a distinct orbit, or at some later time.

At 440 of flow diagram 400, in one embodiment, the method determines a projected orbit for a GNSS satellite by utilizing a time series of range data for the satellite as an input to an orbit projector of the GNSS receiver. For example, in one embodiment, a time series of range data, such as time series of range data 510 is provided as an input to orbit projector 240 of GNSS receiver 200. Orbit projector 240 then projects a future orbit for the particular satellite (e.g., GPS satellite vehicle 60) which time series of range data 510 is associated with. It is appreciated that this process may be repeated by orbit projector 240 to determine projected orbits for a plurality of GNSS satellites. For example, by using time serialized range data for one or more of a plurality of GNSS satellites as inputs, orbit projector 240 produces a projected orbit for each GNSS satellite for which a time serialized range data input is received.

At 450 of flow diagram 400, in one embodiment, the method stores a projected orbit within the GNSS receiver. In various embodiments, such orbit projections are periodically or continually being determined by orbit projector 240. The projected orbits may be utilized immediately, provided as an output from GNSS receiver 200, and/or stored for future use, such as within orbit storage 220 of GNSS receiver 200. In one embodiment, a particular event triggers the calculation, storage, use, and/or output of projected orbits for one or more satellites. Some examples of such events include a shut down of GNSS receiver 200, a power up of GNSS receiver 200, a re-initialization of GNSS receiver 200, receipt of a new distinct broadcast from a satellite, and a request from an exterior source such as another GNSS receiver.

In one embodiment, when an orbit is calculated, stored, and/or output from GNSS receiver 200, a range of validity is associated with that projected orbit. The range of validity will typically vary between several hours and several days based upon several factors, such as the desired particularity with which the projected orbit is required to accurately predict the location of a satellite and the desired resolution required for location and navigation computations within a GNSS receiver. For example, an orbit may be valid for a period of two days for accurately predicting the orbit of a satellite to within a sphere of 20 meters from its actual location. After two days, the projected orbit may still be valid for use in fast acquisition, but cannot be utilized to immediately perform engineering work such as surveying unless the baselines are short.

Other factors which may impact the range of validity of a projected orbit include the number and type of parameters integrated in the orbit projection performed by orbit projector 240. For example, to increase speed, decrease processor demands, and decrease memory demands, many parameters may be omitted from integration in the orbit projection calculation performed by orbit projector 240. For example, because ionospheric and tropospheric perturbations are corrected for in the broadcast orbits received from GPS satellites, the serialized range data converted from such broadcasts already contains corrections for these signal perturbations. Thus, in one embodiment, orbit projector 240 does not include parameters which model ionospheric and tropospheric perturbations. In one embodiment, if it is desired only to project an orbit which is valid for a span of, for instance two days, orbit projector 240 utilizes fewer parameters to model the effects of earth gravity upon the orbit of a satellite. For example, the number of parameters used to model earth gravity may be reduced from over 1000 to approximately 100 or fewer, or even many fewer than 100. Similarly, orbit projector 240 may also reduce or eliminate other parameters, such as parameters for modeling planetary gravity (e.g., effects of gravity of the moon, sun, and planets (other than Earth)).

Example Method for Autonomous Fast Acquisition of a GNSS Satellite

FIG. 6 illustrates a flow diagram 600 of an example method for autonomous fast acquisition of a GNSS satellite, in accordance with one embodiment. By autonomous, what is meant is that a GNSS receiver utilizes no information received from outside sources other than transmissions from GNSS satellites. In other words, actual orbits or orbit projections of the GNSS satellites are not retrieved from an outside source, instead orbital projections and fast acquisition data utilized for autonomous fast acquisition are generated by the GNSS receiver. The operation of the method of flow diagram 600 is described with reference to components and functionality GNSS receiver 200, RTK base station 310 and rovers 320A and 320B, and elements of the method of flow diagram 400. It is appreciated that elements of the method of flow diagram 400 which are practiced as part of the method of flow diagram 600 are only described in brief, and that reference is made to the previous descriptions of these elements for more detailed description.

At 410 of flow diagram 600, in one embodiment, the method receives distinct broadcast orbits from a GNSS satellite. The distinct broadcast orbits are received in a GNSS receiver, such as GNSS receiver 200, over time during operation of the GNSS receiver.

At 420 of flow diagram 600, in one embodiment, the method stores a plurality of the received distinct broadcast orbits within the GNSS receiver. For example, after being received by orbit receiver 210, the received distinct broadcast orbits are communicatively coupled to orbit storage 220, where they are stored as a collection of distinct broadcast orbits. In orbit storage 220 each collection of distinct broadcast orbits is associated with the particular satellite which transmitted the distinct broadcast orbits that comprise the collection. In this manner a collection of distinct broadcast orbits may be stored for each of a plurality of GNSS satellites.

At 430 of flow diagram 600, in one embodiment, the method converts a plurality of the stored broadcast orbits into a time series of range data for the GNSS satellite from which the broadcast orbits were transmitted. The converting is performed within the GNSS receiver. For example, in one embodiment, range data converter 230 converts some or all of the distinct broadcast orbits of a collection stored within orbit storage 220 into a time series of range data. It is appreciated that in this same manner, range data converter 230 may also convert a plurality of such stored distinct broadcast orbits from each a plurality of GNSS satellites into time serialized range data for each of the plurality of GNSS satellites.

At 440 of flow diagram 600, in one embodiment, the method determines a projected orbit for a GNSS satellite by utilizing a time series of range data for the satellite as an input to an orbit projector of the GNSS receiver. For example, in one embodiment, a time series of range data is provided as an input to orbit projector 240 of GNSS receiver 200. Orbit projector 240 then projects a future orbit for the particular satellite with which a time series of range data is associated. It is appreciated that such orbit projections may be performed for some or all of a plurality of GNSS satellites for which time serialized range data has been calculated.

At 450 of flow diagram 600, in one embodiment, the method stores a projected orbit within the GNSS receiver. In various embodiments, such orbit projections are periodically or continually being determined by orbit projector 240. The projected orbits may be utilized immediately, provided as an output from GNSS receiver 200, and/or stored for future use, such as within orbit storage 220 of GNSS receiver 200. It is appreciated in some embodiments, if a projected orbit is calculated on an as required basis, it may not be stored.

At 660 of flow diagram 600, in one embodiment, the method performs a fast acquisition of a GNSS satellite based upon a projected orbit for the GNSS satellite. This is done at a future initialization of the GNSS receiver. Fast acquisition calculator 250 utilizes the projected orbit to perform a fast acquisition of the GNSS satellite upon a future initialization (e.g., a startup or re-initialization which triggers a reacquisition of satellites) of GNSS receiver 200. It is appreciated that the projected orbit may be calculated at the time of initialization, or else a previously stored projected orbit may be retrieved from storage within GNSS receiver 200. For instance, if GNSS receiver 200 has been restarted after being shut off for a period of time such as a day or overnight, fast acquisition calculator 250 may retrieve a projected orbit from orbit storage 220 and then utilize the projected orbit to perform a fast acquisition of a GNSS satellite. In one embodiment, this comprises utilizing the projected orbit to determine a tuning frequency for tuning the GNSS receiver to a broadcast from the GNSS satellite associated with the projected orbit. In such a manner the GNSS satellite is acquired much faster than if a variety of possible Doppler shifted frequencies were scanned through by GNSS receiver 200 as it attempted to acquire a signal from the GNSS satellite.

Techniques for performing fast acquisition with old stored orbits are known and described, for example, in U.S. Pat. No. 6,225,945 by Peter Loomis, entitled: "GPS Receiver Using Coarse Orbital Parameters for Achieving a Fast Time to First Fix." The techniques described herein operate in a similar fashion, but utilize projected orbits that have been projected within GNSS receiver 200. For example, in one embodiment, as part of performing a fast acquisition of the GNSS satellite based upon the projected orbit for the GNSS satellite, a projected orbit for the GNSS satellite (e.g., GNSS satellite 205 of FIG. 2) is retrieved from orbit storage 220 of GNSS receiver 200. By comparing a time maintained by GNSS receiver to the range of validity associated with the projected orbit, fast acquisition calculator 250 determines if the projected orbit is within its range of validity. If the projected orbit is within its range of validity, fast acquisition calculator 250 performs a fast acquisition of the GNSS satellite based upon the projected orbit. This may comprise determining if the GNSS satellite is in view/available, and if so, what Doppler shift will be need to be added or subtracted to a carrier frequency/frequencies to tune GNSS receiver 200 to acquire one or more signals from the GNSS satellite. The Doppler shift can be determined based on the projected orbit and a known or estimated location of GNSS receiver 200. It is appreciated that when using highly accurate projected orbits (e.g., accurate to 20 meters of actual satellite location) the time required to autonomously acquire a plurality of GNSS satellites and begin to generate accurate enough positional information to perform engineering work, such as surveying, can be cut from a number of minutes down to several seconds (e.g., 3-15 seconds).

It is appreciated that in some embodiments a projected orbit is transmitted by either wired (e.g., serial cable) or wireless (e.g., WiMAX or radio transmission) means from GNSS receiver 200 to another GNSS receiver. The second GNSS receiver then utilizes the projected orbit to perform a fast acquisition of the GNSS satellite. For example, the second GNSS satellite may utilize the projected orbit to determine if a satellite is available and if so, to determine a tuning frequency for tuning the second GNSS receiver to receive a broadcast being transmitted from the GNSS satellite. For example, the projected orbits for one or more GNSS satellites can be transmitted from GNSS receiver 200 to a second GNSS receiver to assist the second GNSS receiver in fast acquisition.

It is appreciated that in some embodiments after the fast acquisition data (such as data regarding GNSS satellite availability and tuning frequencies) is generated in GNSS receiver 200, it is transmitted either by either wired (e.g., serial cable) or wireless (e.g., WiMAX or radio transmission) means from GNSS receiver 200 to one or more other GNSS receivers on an as needed basis. For example, the fast acquisition data for one or more GNSS satellites can be transmitted from GNSS receiver 200 to a second GNSS receiver to assist the second GNSS receiver in fast acquisition.

Referring again to FIG. 3. In one embodiment, when RTK base station 310 is started up or re-initialized, projected orbit (s) and/or fast acquisition data generated autonomously by GNSS receiver 200 is transmitted such that rover 320A and/or 320B can receive the projected orbit(s) and/or fast acquisition data. This allows GNSS receivers 300A and 300B to perform a fast acquisition of GNSS satellites and/or quickly be generating accurate positional data which is suitable for use in engineering work, such as surveying.

Embodiments of the subject matter are thus described. While the subject matter has been described in particular embodiments, it should be appreciated that the subject matter should not be construed as limited by such embodiments, but rather construed according to the following claims.

What is claimed is:

1. A method of autonomous orbit projection performed within a Global Navigation Satellite System (GNSS) receiver, said method comprising:
   receiving distinct broadcast orbits from a GNSS satellite, said distinct broadcast orbits received in a GNSS receiver over time during operation of said GNSS receiver;
   storing a plurality of said distinct broadcast orbits within said GNSS receiver;
   converting a plurality of said stored broadcast orbits into a time series of range data for said GNSS satellite, said converting performed within said GNSS receiver; and
   determining a projected orbit for said GNSS satellite by utilizing said time series of range data as an input to an orbit projector of said GNSS receiver.

2. The method as recited in claim 1, further comprising:
   storing said projected orbit within said GNSS receiver.

3. The method as recited in claim 2 wherein said, storing said projected orbit within said GNSS receiver further comprises:
   associating a range of validity with said projected orbit.

4. The method as recited in claim 1, wherein said receiving distinct broadcast orbits from a GNSS satellite comprises:
   receiving distinct broadcast orbits from a Global Positioning System (GPS) satellite.

5. The method as recited in claim 1, wherein said receiving distinct broadcast orbits from a GNSS satellite further comprises:
  receiving a plurality of distinct broadcast orbits from a plurality of GNSS satellites.

6. The method as recited in claim 5, wherein said storing a plurality of said distinct broadcast orbits within said GNSS receiver further comprises:
  storing within said GNSS receiver a collection of said distinct broadcast orbits for each of said plurality of GNSS satellites.

7. The method as recited in claim 6, wherein said converting a plurality of said stored distinct broadcast orbits into a time series of range data for said GNSS satellite further comprises:
  converting a plurality of said stored distinct broadcast orbits from each of said plurality of GNSS satellites into time serialized range data for each of said plurality of GNSS satellites, said converting performed within said GNSS receiver.

8. The method as recited in claim 7, wherein said determining a projected orbit for said GNSS satellite by utilizing said time series of range data as an input to an orbit projector of said GNSS receiver further comprises:
  determining projected orbits for each of said plurality of GNSS satellites by using said time serialized range data for each of said GNSS satellites as inputs to said orbit projector of said GNSS receiver.

9. A method for autonomous fast acquisition of a Global Navigation Satellite System (GNSS) satellite, said method comprising:
  receiving distinct broadcast orbits from a GNSS satellite, said distinct broadcast orbits received in a GNSS receiver over time during operation of said GNSS receiver;
  storing a plurality of said distinct broadcast orbits within said GNSS receiver;
  converting a plurality of said stored distinct broadcast orbits into a time series of range data for said GNSS satellite, said converting performed within said GNSS receiver;
  determining a projected orbit for said GNSS satellite by utilizing said time series of range data as an input to an orbit projector of said GNSS receiver;
  storing said projected orbit within said GNSS receiver; and
  upon a future initialization of said GNSS receiver, performing a fast acquisition of said GNSS satellite based upon said projected orbit for said GNSS satellite.

10. The method as recited in claim 9, wherein said receiving distinct broadcast orbits from a GNSS satellite comprises:
  receiving distinct broadcast orbits from a Global Positioning System (GPS) satellite.

11. The method as recited in claim 9, wherein said performing a fast acquisition of said GNSS satellite based upon said projected orbit for said GNSS satellite comprises:
  utilizing said projected orbit to determine a tuning frequency for tuning said GNSS receiver to a broadcast from said GNSS satellite.

12. The method as recited in claim 9, wherein said performing a fast acquisition of said GNSS satellite based upon said projected orbit for said GNSS satellite comprises:
  retrieving said projected orbit from storage within said GNSS receiver;
  determining if said projected orbit is within a range of validity associated with said projected orbit; and
  if said projected orbit is within said range of validity, performing said fast acquisition of said GNSS satellite based upon said projected orbit.

13. The method as recited in claim 9, wherein said performing a fast acquisition of said GNSS satellite based upon said projected orbit for said GNSS satellite comprises:
  transmitting said projected orbit from said GNSS receiver to a second GNSS receiver; and
  utilizing said projected orbit within said second GNSS receiver to perform fast acquisition of said GNSS satellite.

14. The method as recited in claim 13, wherein said utilizing said projected orbit within said second GNSS receiver to perform fast acquisition of said GNSS satellite comprises:
  utilizing said projected orbit to determine a tuning frequency for tuning said second GNSS receiver to a broadcast from said GNSS satellite.

15. A system for autonomous projection of a GNSS satellite orbit, said system comprising:
  a GNSS receiver;
  an orbit receiver disposed within said GNSS receiver and disposed within a common housing with said GNSS receiver;
  an orbit storage coupled with said orbit receiver and disposed within said common housing, said orbit storage configured to store collections of distinct broadcast orbits received by said orbit receiver for each of a plurality of GNSS satellites;
  a range data converter coupled with said orbit storage and disposed within said common housing, said range data converter configured for converting a collection of said collections of broadcast orbits into a time series of range data for a GNSS satellite which said collection of broadcast orbits is associated with; and
  an orbit projector coupled with said range data converter and housed within said common housing, said orbit projector configured for accepting said time series of range data as an input for use in determining a projected orbit for said GNSS satellite.

16. The system of claim 15, further comprising:
  a fast acquisition calculator disposed within said common housing, said fast acquisition calculator configured for utilizing said projected orbit to determine a tuning frequency for tuning said GNSS receiver to a broadcast from said GNSS satellite.

17. The system of claim 15, wherein a collection of said collections of broadcast orbits comprises a plurality of distinct broadcast orbits for a particular GNSS satellite said collection having been received by said orbit receiver via over the air broadcasts from said particular GNSS satellite.

18. The system of claim 15 wherein said GNSS receiver is a GPS receiver.

19. The system of claim 15, wherein said GNSS receiver is a part of a Real Time Kinematics (RTK) base station.

20. The system of claim 19, wherein said GNSS receiver transmits said projected orbit to a second GNSS receiver to assist in performance of fast acquisition of said GNSS satellite at said second GNSS receiver.

21. The system of claim 19, wherein said GNSS receiver transmits fast acquisition data to a second GNSS receiver to assist in performance of fast acquisition of said GNSS satellite at said second GNSS receiver.

* * * * *